US012239999B1

(12) United States Patent
Fernandes

(10) Patent No.: US 12,239,999 B1
(45) Date of Patent: Mar. 4, 2025

(54) AIR QUALITY CONTROL

(71) Applicant: AQMC LLC, Ontario, CA (US)

(72) Inventor: Karim Brian Fernandes, Ontario, CA (US)

(73) Assignee: AQMC LLC, Ontario, CA (US)

( * ) Notice: Subject to any disclaimer, the term of this patent is extended or adjusted under 35 U.S.C. 154(b) by 570 days.

(21) Appl. No.: 17/534,039

(22) Filed: Nov. 23, 2021

Related U.S. Application Data

(60) Provisional application No. 63/117,602, filed on Nov. 24, 2020.

(51) Int. Cl.
*B03C 3/49* (2006.01)
*B03C 3/68* (2006.01)
*F24F 8/192* (2021.01)

(52) U.S. Cl.
CPC .................. *B03C 3/49* (2013.01); *B03C 3/68* (2013.01); *F24F 8/192* (2021.01)

(58) Field of Classification Search
None
See application file for complete search history.

(56) References Cited

U.S. PATENT DOCUMENTS 3,674,421 A * 7/1972 Decupper ................. A61L 9/20 422/120
4,102,654 A * 7/1978 Pellin ...................... H01T 23/00 422/24
4,961,763 A * 10/1990 Thompson ............. B01D 53/85 435/266
5,136,461 A * 8/1992 Zellweger ................ A61N 1/10 361/231
5,268,151 A * 12/1993 Reed ........................ C01B 13/11 422/186.16
5,330,722 A * 7/1994 Pick .......................... A61L 9/16 250/492.1
5,364,600 A * 11/1994 Stiehl ...................... C01B 13/11 422/186.18
5,397,382 A * 3/1995 Anderson ................ A01G 9/02 47/65.5
5,409,673 A * 4/1995 Mausgrover ............ C01B 13/11 422/907
5,554,344 A * 9/1996 Duarte .................... C01B 13/11 422/907
5,558,158 A * 9/1996 Elmore ..................... A61L 9/20 165/122
6,221,314 B1 * 4/2001 Bigelow ................ A62B 29/00 422/186
6,500,387 B1 * 12/2002 Bigelow ................... A61L 9/20 55/286

(Continued)

FOREIGN PATENT DOCUMENTS

JP 2001327820 A * 11/2001
WO WO-2006086720 A2 * 8/2006 ............. A61B 17/20
WO WO-2007136721 A2 * 11/2007 ............... A61L 9/16

*Primary Examiner* — Christopher P Jones
*Assistant Examiner* — Sonji Turner
(74) *Attorney, Agent, or Firm* — Smith & Woldesenbet Law Group, PLLC

(57) ABSTRACT

An electrode tube for generating electrons includes a container unit, a metal wool positioned in the container unit, and a socket, wherein the container unit is attached to the socket. The electrode tube is configured to generate electrons that bond with oxygen when electrical power is provided to the electrode tube.

20 Claims, 12 Drawing Sheets

(56) References Cited

U.S. PATENT DOCUMENTS

| | | | | |
|---|---|---|---|---|
| 6,589,486 | B1 * | 7/2003 | Spanton | F24F 11/30 422/120 |
| 6,730,265 | B2 * | 5/2004 | Horton, III | A61L 9/205 250/455.11 |
| 6,752,970 | B2 * | 6/2004 | Schwartz | B01D 53/38 422/186.04 |
| 6,832,844 | B2 * | 12/2004 | Guzorek | H01J 61/52 362/264 |
| 6,955,708 | B1 * | 10/2005 | Julos | F24F 8/194 422/186.04 |
| 6,997,578 | B2 * | 2/2006 | Culbert | A61L 9/20 362/267 |
| 7,040,101 | B2 * | 5/2006 | Takeda | F24F 8/192 62/264 |
| 7,175,814 | B2 * | 2/2007 | Dionisio | A61L 9/20 422/123 |
| 7,344,685 | B2 * | 3/2008 | McNulty | A61L 2/202 422/292 |
| 7,416,588 | B2 * | 8/2008 | Burrows | A61L 9/20 422/24 |
| 7,419,642 | B2 * | 9/2008 | Fowler | F24F 3/16 250/436 |
| 7,674,436 | B1 * | 3/2010 | Feldman | A61L 9/205 55/482 |
| 7,988,923 | B2 * | 8/2011 | Fink | A61L 9/205 422/186.3 |
| 8,959,929 | B2 * | 2/2015 | Nun | F25B 9/14 62/6 |
| 8,997,515 | B2 * | 4/2015 | Silderhuis | F24F 8/192 454/333 |
| 9,011,780 | B1 * | 4/2015 | Burnett | B01D 53/885 422/24 |
| 9,711,317 | B2 * | 7/2017 | Weibel | A61L 9/22 |
| 9,744,501 | B1 * | 8/2017 | Pingitore | F24F 3/14 |
| 9,907,874 | B2 * | 3/2018 | Bender | H01T 23/00 |
| 9,908,081 | B2 * | 3/2018 | Bender | B01D 53/8675 |
| 9,908,082 | B2 * | 3/2018 | Bender | G01N 33/0039 |
| 10,010,644 | B2 * | 7/2018 | Burnett | B01D 53/885 |
| 2006/0002051 | A1 * | 1/2006 | Goudy | C01B 13/11 361/220 |
| 2021/0052764 | A1 * | 2/2021 | Terkelsen | F24F 8/108 |

* cited by examiner

AIR QUALITY CONTROL

CROSS-REFERENCE TO RELATED APPLICATIONS

This application claims priority under 35 U.S.C. § 119 to U.S. Provisional Patent Application No. 63/117,602, titled "Air Quality Control" and filed on Nov. 24, 2020, the entire content of which is incorporated herein by reference.

TECHNICAL FIELD

The present disclosure relates generally to ozone free air quality control, and more particularly to electron generation for air quality control.

BACKGROUND

It is generally desirable to have good air quality in both residential and commercial spaces. Indoor air quality can be important to an occupant's health and comfort. For example, odor and viruses can affect an occupant's health as well as comfort. In general, indoor air quality can be affected by pollutants that enter an indoor space as well as contaminants released and/or resulting from indoor activities and items such as furniture, cleaning material, cooking, etc. Indoor air quality may have a heightened importance in some locations, such as hospitals, clinics, nursing homes, etc. Further, sustainability standards, such as ASHRAE (American Society of Heating, Refrigerating and Air-Conditioning Engineers) specify standards related to contaminants/pollutants levels, and it may be desirable to meet such standards. Pollutants, odor, viruses, etc. can also affect air quality in other spaces such as inside vehicles and other confined spaces. Odor and air contaminants may also be a major challenge to control in some facilities such as sewer treatment facilities, etc. One solution that can improve air quality involves the use of negatively charged oxygen ions. Thus, a solution that enables the generation of electrons that can bond with oxygen molecules to produce negative oxygen ions may be desirable.

SUMMARY

The present disclosure relates generally to ozone free air quality control, and more particularly to electron generation for air quality control. In an example embodiment, an electrode tube for generating electrons includes a container unit, a metal wool positioned in the container unit, and a socket, wherein the container unit is attached to the socket. The electrode tube is configured to generate electrons that bond with oxygen when electrical power is provided to the electrode tube.

In another example embodiment, an air quality management device includes an electrode tube and a transformer configured to provide electrical power to the electrode tube. The electrode tube comprises a container unit, a metal wool positioned in the container unit, and a socket, wherein the container unit is attached to the socket.

In another example embodiment, an air quality management system includes an air quality management device that includes an electrode tube and a transformer configured to provide electrical power to the electrode tube. The electrode tube includes a container unit, a metal wool positioned in the container unit, and a socket, where the container unit is attached to the socket. The air quality management system also includes a blower positioned to cause input air to flow past the electrode tube such that electrons produced by the electrode tube bond to oxygen in the input air resulting in output air that contains negatively charged oxygen ions. The blower is positioned to cause the output air to exit the air quality management system.

These and other aspects, objects, features, and embodiments will be apparent from the following description and the appended claims.

BRIEF DESCRIPTION OF THE FIGURES

Reference will now be made to the accompanying drawings, where.

Figure 1:
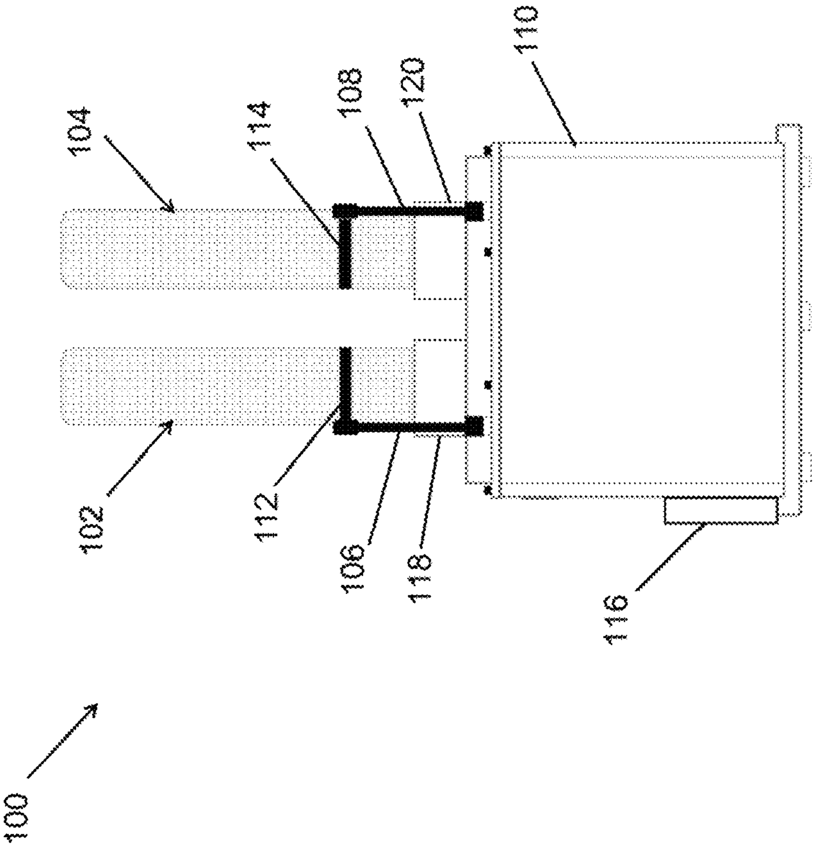
FIG. 1 illustrates an air quality management device according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals that are used in different drawings designate like or corresponding but not necessarily identical elements.

DETAILED DESCRIPTION OF EXAMPLE EMBODIMENTS

In the following paragraphs, particular embodiments will be described in further detail by way of example with reference to the figures. In the description, well known components, methods, and/or processing techniques are omitted or briefly described. Furthermore, reference to various feature(s) of the embodiments is not to suggest that all embodiments must include the referenced feature(s).

FIG. 1 illustrates an air quality management device 100 according to an example embodiment. In some example embodiments, the air quality management device 100 includes multiple electrode tubes including electrode tubes 102, 104. The air quality management device 100 further includes earth straps 106, 108, a housing 110, and a junction box 116 The electrode tubes 102, 104 may be attached to the housing 110. For example, the electrode tubes 102, 104 may extend up on a top side of the housing 110 in the orientation shown in FIG. 1. To illustrate, the electrode tube 102 may include a socket 118 that is attached to the housing 110, and the electrode tube 104 may include a socket 120 that is attached to the housing 110. The electrode tubes 102, 104 may be connected electrically to a transformer contained in the housing 110 as explained below.

In some example embodiments, the earth strap 106 may be connected to the electrode tube 102, and the earth strap 108 may be connected to the electrode tube 104. The earth straps may be connected electrically to a transformer contained in the housing 110 as explained below. The earth strap 106 may include a bracket 112 that is attached to and placed at least partially around the electrode tube 102. The earth strap 108 may include a bracket 114 that is attached to and placed at least partially around the electrode tube 104.

In some example embodiments, the junction box 116 may be attached to the housing 110. Electrical connections between electrical wires may be contained in the junction box 116 as can be readily understood by those of ordinary skill in the art with the benefit of the scope of this disclosure.

In some example embodiments, the housing 110 may be made from plastic (e.g., Polyvinyl chloride (PVC)). For example, the housing 110 may be made using methods such as molding, etc. as can be readily understood by those of ordinary skill in the art with the benefit of the scope of this disclosure. When the housing 110 is made from plastic, the air quality management device 100 may be entirely positioned in an air conditioning duct, such a supply duct, a return duct, a mixing plenum, etc. In some alternative embodiments, the housing 110 may be made from another suitable material including ceramic, etc. without departing from the scope of this disclosure.

Figure 2A:
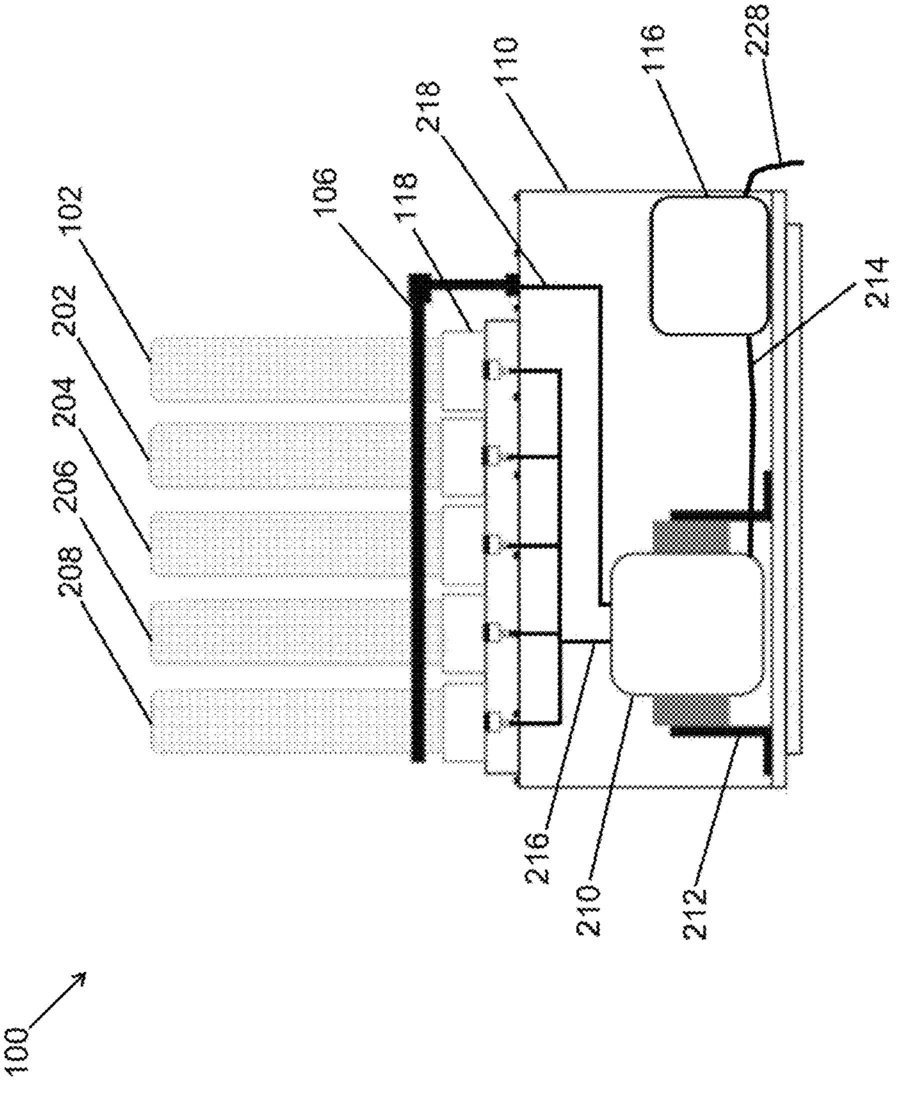
FIGS. 2A and 2B illustrate different views of the air quality management device of FIG. 1 according to an example embodiment.
Figure 2B:
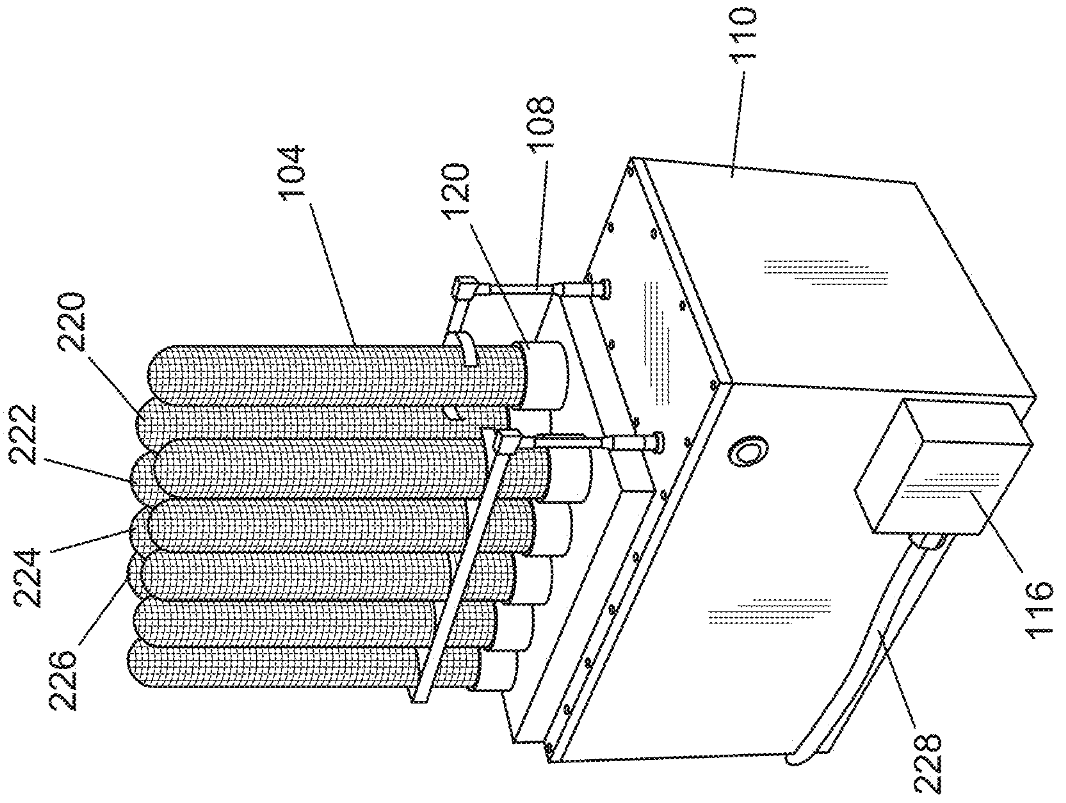

FIGS. 2A and 2B illustrate different views of the air quality management device 100 of FIG. 1 according to an example embodiment. FIG. 2A shows the inside of the housing 110 for illustrative purposes. Referring to FIGS. 1-2B, in some example embodiments, the air quality management device 100 includes the electrode tubes 102, 104 shown in FIG. 1, and electrode tubes 202, 204, 206, 208, 220, 222, 224, 226. The electrode tubes 102, 104, 202-208, 220-226 may be attached to the housing 110. To illustrate, each electrode tube 102, 104, 202-208, 220-226 may include a socket that is attached to the housing 110. The electrode tubes 102, 104, 202-208, 220-226 may extend up on the top side of the housing 110 in the orientation shown in FIGS. 1-2B.

In some example embodiments, the earth strap 106 may be connected to the electrode tubes 102, 202-208, and the earth strap 108 may be connected to the electrode tubes 104, 220-226. The earth straps 106, 108 may be connected to the transformer 210 by an electrical cable 218. Individual brackets of the earth strap 106, such as the bracket 112, may be attached to a respective one of the electrode tubes 102, 202-208, and individual brackets of the earth strap 108, such as the bracket 114, may be attached to a respective one of the electrode tubes 104, 220-226. The earth straps 106, 108 are described below in more detail with respect to FIGS. 3A and 3B.

In some example embodiments, the air quality management device 100 includes a transformer 210 that provides one or more voltages to the electrode tubes 102, 104, 202-208, 220-226. The transformer 210 may be secured to the housing 110 using brackets, such as a bracket 212 as can be readily understood by those of ordinary skill in the art with the benefit of the scope of this disclosure. An electrical cable 214 may extend between the junction box 116 and the transformer 210. The electrical cable 214 may be connected to another electrical cable 228 inside the junction box 116. For example, the electrical cable 228 may include wires that are connected to a power supply, such as a mains/utility power supply. The electrical cable 228 may also include electrical wires that can carry control signals for controlling the transformer 210.

In some example embodiments, an output terminal of the transformer 210 may be connected to the electrode tubes 102, 104, 202-208, 220-226 by an electrical cable 216. For example, the electrical wires of the electrical cable 216 may be connected to an electrode screw of each electrode tube 102, 104, 202-208, 220-226 that is used to secure the electrode tubes to the housing 110. The voltage provided by the transformer 210 to each electrode tube 102, 104, 202-208, 220-226 may range from approximately 2,000 volts AC to approximately 20,000 volts AC. For example, the transformer 210 may provide approximately 2,000 volts AC to each electrode tube 102, 104, 202-208, 220-226. As another example, the transformer 210 may provide approximately 10,000 volts AC to each electrode tube 102, 104, 202-208, 220-226. As yet another example, the transformer 210 may provide approximately 20,000 volts AC to each electrode tube 102, 104, 202-208, 220-226. In some alternative embodiments, the transformer 210 may provide to each electrode tube 102, 104, 202-208, 220-226 a voltage that is above or below the 2,000-20,000 volts AC range without departing from the scope of this disclosure. The voltage provided by the transformer 210 may be fixed at manufacturing or may be adjustable at installation or after installation.

In some example embodiments, each electrode tube 102, 104, 202-208, 220-226 includes a socket that is attached to the housing 110 by a respective screw (e.g., a respective one of the electrode screw 406 described below). For example, the electrode tube 102 may include a socket 118, and the electrode tube 104 may include a socket 120. For example, the socket of each electrode tube 102, 104, 202-208, 220-226 may be made from one or more materials such as plastic (e.g., PVC), a composite material (e.g., G10/FR-4), and/or ceramic. Alternatively, the sockets may be made from another suitable material without departing from the scope of this disclosure.

In some example embodiments, the air quality management device 100 may generate electrons. To illustrate, each electrode tube 102, 104, 202-208, 220-226 may generate electrons. Each electrode tube 102, 104, 202-208, 220-226 may generate electrons independent of the other electrode tubes 102, 104, 202-208, 220-226. The number of electrons generated by each electrode tube 102, 104, 202-208, 220-226 may depend on a number of factors. For example, the number of electrons generated by each electrode tube 102, 104, 202-208, 220-226 may depend on the voltage level provided to the individual electrode tube by the transformer

210. The number of electrons generated by each electrode tube 102, 104, 202-208, 220-226 may also depend on the dimensions of the electrode tube 102, 104, 202-208, 220-226. The number of electrons generated by each electrode tube 102, 104, 202-208, 220-226 may also depend on other factors such as the materials used to make the electrode tubes.

The electrons generated by the air quality management device 100 may polarize oxygen molecules in the air, resulting in negatively charged oxygen ions. The negatively charged oxygen ions may neutralize pollutants, viruses, odor, etc. For example, the negatively charged oxygen ions, which may also form oxygen clusters with other oxygen ions and molecules, may neutralize pollutants, odor, viruses, bacteria, fungus, mold, Protozoa, etc. in the air, on equipment (e.g., filter, coil, etc.) that is exposed to the negatively charged oxygen ions, etc. The air quality management device 100 generates the electrons without creating ozone during the process.

In some alternative embodiments, the electrode tubes 102, 104, 202-208, 220-226 may extend out on a different side of the housing 110 than shown without departing from the scope of this disclosure. In some alternative embodiments, the air quality management device 100 may include fewer or more electrode tubes than shown without departing from the scope of this disclosure. For example, the air quality management device 100 may include as few as one electrode tube or more than 10 electrode tubes (e.g., 20 electrode tubes). As another example, the air quality management device 100 may include one, two, three, four, five, six, seven, eight, or nine electrode tubes. In some alternative embodiments, the electrode tubes may be arranged differently than shown without departing from the scope of this disclosure. For example, all of the electrode tubes may be arranged linearly. As another example, the electrode tubes may be staggered. In some alternative embodiments, the electrode tubes may have a different shape than shown without departing from the scope of this disclosure.

Figure 3B:
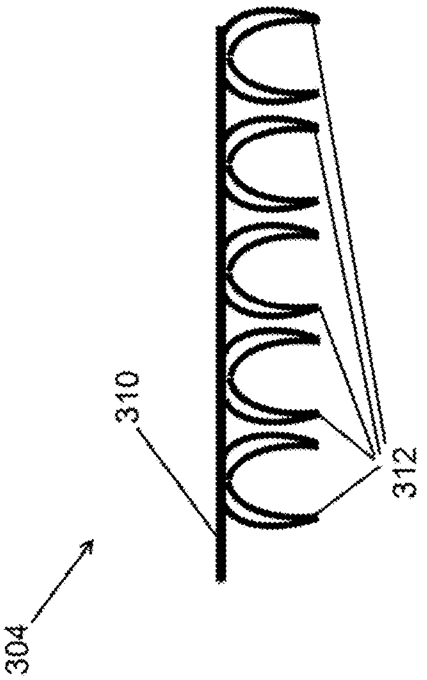
FIGS. 3A and 3B illustrate components of the earth strap units of the air quality management device of FIG. 1 according to an example embodiment.
Figure 3A:
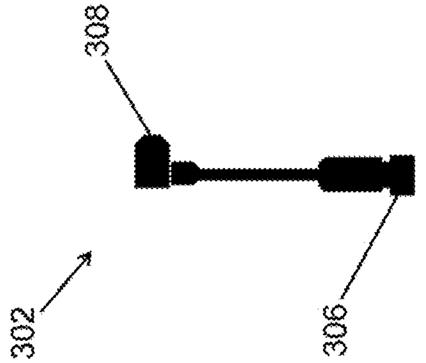

FIGS. 3A and 3B illustrate components of the earth strap units of the air quality management device of FIG. 1 according to an example embodiment. Referring to FIGS. 1-3B, in some example embodiments, each earth strap 106, 108 (more clearly shown in FIG. 1) may include a strap base 302 and a strap cable unit 304. The strap base 302 may include a housing connector 306 and a strap cable connector 308 that may be at opposite ends of the strap base 302 from each other. The housing connector 306 may be connected to the housing 110. The strap cable unit 304 may include a cable 310 and brackets 312 that extend out from the cable 310. The strap cable connector 308 may be connected to the cable 310. For example, the bracket 112 of the earth strap 106 and the bracket 114 of the earth strap 108 shown in FIG. 1 may each correspond to one of the brackets 312. Each bracket 312 may be attached to and placed at least partially around a respective one of the electrode tubes 102, 104, 202-208, 220-226. Each bracket 312 makes an electrical connection with the respective electrode tube. The strap base 302 may include one or more electrical wires that extend through or are covered by an external insulator. The cable 310 may include one or more electrical wires that extend through or are covered by an external insulator.

In some alternative embodiments, the strap cable unit 304 may include fewer or more of the brackets 312 than shown without departing from the scope of this disclosure. In some alternative embodiments, the brackets 312 may have a different shape than shown without departing from the scope of this disclosure. In some alternative embodiments, the strap base 302 and/or the strap cable unit 304 may have a different shape than shown without departing from the scope of this disclosure.

Figure 5:
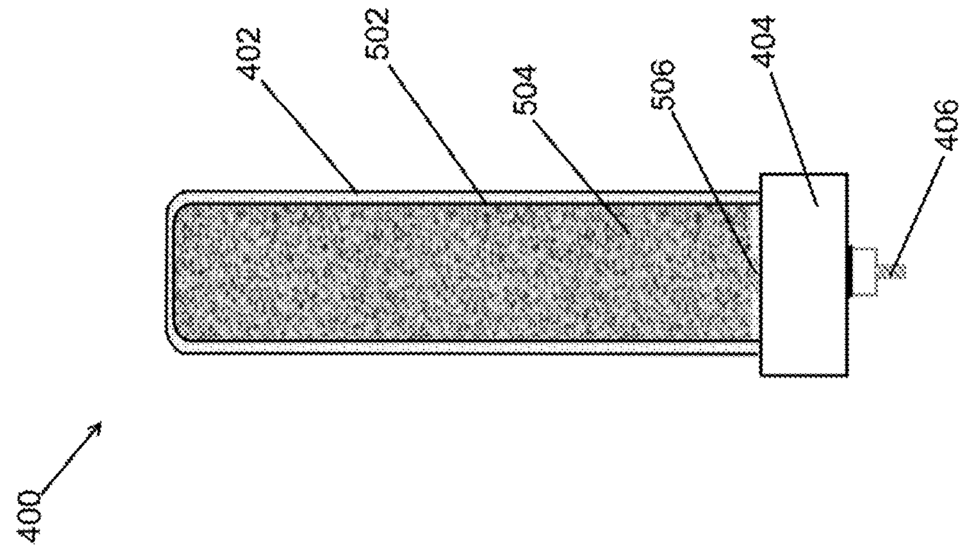
FIG. 5 illustrates the electrode tube of FIG. 4 with a metal mesh of the electrode tube partially removed for clarity of illustration according to an example embodiment.
Figure 4:
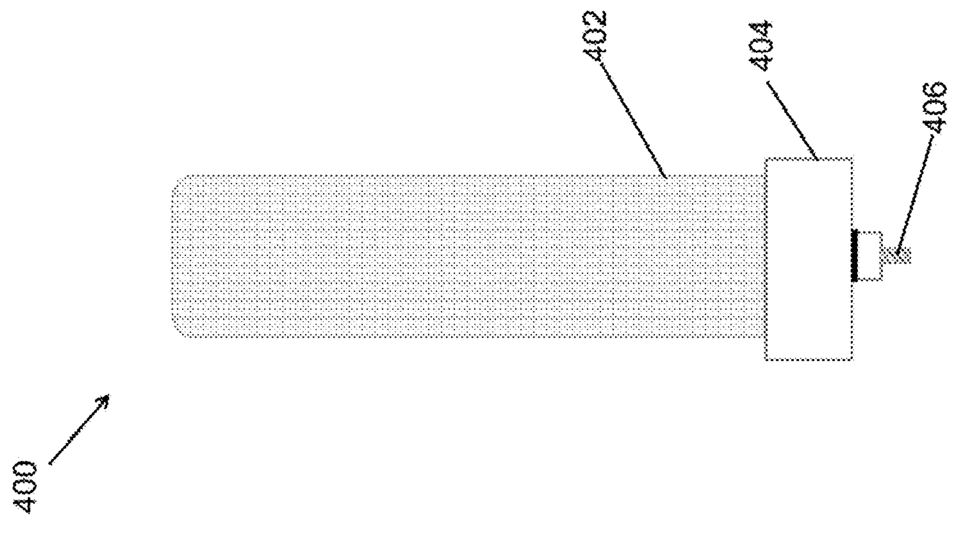
FIG. 4 illustrates a side view of an electrode tube corresponding to the electrode tubes of the air quality management device of FIG. 1 according to an example embodiment.
Figure 6:
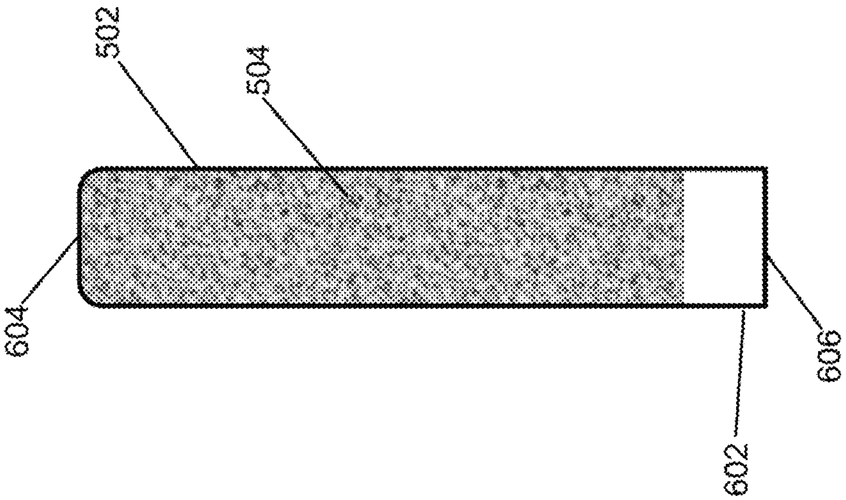
FIG. 6 illustrates a container unit of the electrode tube of FIG. 4 containing metal wool according to an example embodiment.

FIG. 4 illustrates a side view of an electrode tube 400 corresponding to the electrode tubes 102, 104, 202-208, 220-226 of the air quality management device 100 of FIG. 1 according to an example embodiment. FIG. 5 illustrates the electrode tube 400 of FIG. 4 with a metal mesh 402 of the electrode tube partially removed for clarity of illustration according to an example embodiment. FIG. 6 illustrates the container unit 502 of the electrode tube of FIG. 4 containing the metal wool 504 according to an example embodiment. Referring to FIGS. 1-6, in some example embodiments, the electrode tube 400 includes a wire mesh 402, a socket 404, and an electrode screw 406. The socket 404 corresponds to the socket of each electrode tube 102, 104, 202-208, 220-226. For example, the socket 404 corresponds to the socket 118 of the electrode tube 102 and the socket 120 of the electrode tube 104 shown in FIG. 1. The electrode screw 406 may serve to securely attach the electrode tube 400 to a housing such as the housing 110. The electrode screw 406 may also serve as an electrical connection terminal of the electrode tube 400. For example, the electrical cable 216 or a wire of the electrical cable 216 connected to the transformer 210 as shown in FIG. 2A may be connected to the electrode screw 406 of the electrode tube 400.

In some example embodiments, the wire mesh 402 may be made from stainless steel wire (e.g., 410 stainless steel). For example, the wire mesh 402 may be a compressed knitted wire mesh. In some alternative embodiments, the wire mesh 402 may be made from another metal without departing from the scope of this disclosure. In some example embodiments, the wire mesh 402 may be omitted without departing from the scope of this disclosure. In some alternative embodiments, the electrode tube 400 may have a different shape than shown without departing from the scope of this disclosure. In some example embodiments, the electrode tube 400 includes the wire mesh 402, a container unit 502, a metal wool 504, the socket 404, and the electrode screw 406 extending through the socket 404. The wire mesh 402 is positioned on the outside of the container unit 502, and the metal wool 504 is contained inside the container unit 502. A portion 506 of the electrode screw 406 may extend into the metal wool 504 contained in the container unit 502.

In some example embodiments, the container unit 502 may be a quartz container (i.e., a container made from quartz). Alternatively, the container unit 502 may be a glass container. The container unit 502 may generally be tubular having an open end and a closed end. For example, the container unit 502 may be test-tube shaped. Alternatively, the container unit 502 may have another shape without departing from the scope of this disclosure. The wire mesh 402 may have a shape that generally conforms to the shape of the container unit 502. In some alternative embodiments, the wire mesh 402 may have a different shape than the container unit 502 and may still be placed over the container unit 502 without departing from the scope of this disclosure.

In some example embodiments, the metal wool 504 may be steel wool (e.g., 410 stainless steel wool). The metal wool 504 may take on the form of the container unit 502 when the metal wool 504 is placed in the container unit 502 as can be readily understood by those of ordinary skill in the art with the benefit of the scope of this disclosure. In some example embodiments, the container unit 502 may have an open-end portion 602 and a closed end portion 604. The metal wool 504 may be put inside the container unit 502 through an opening 606 at the open-end portion 602. The metal wool

504 may occupy less than 100 percent of the cubic volume of the container unit 502. For example, a portion of the container unit 502 at the open-end portion 602 may be unoccupied by the metal wool 504.

In some example embodiments, the amount of the metal wool 504 contained in the container unit 502 may be varied. For example, the metal wool 504 may occupy approximately 85% of the cubic volume of the container unit 502. Alternatively, the metal wool 504 may occupy less (e.g., 40%) or more (e.g., 90%) than 85% of the cubic volume of the container unit 502 without departing from the scope of this disclosure. In some example embodiments, the container unit 502 may be made from quartz using methods known to those of ordinary skill in the art. For example, using the container unit 502 made from quartz may enable the air quality management device 100 to operate in an environment that has a relatively high temperature (e.g., 50 degree Celsius). In some example embodiments, the container unit 502 may have a length in range of approximately 150 mm to approximately 300 mm and a thickness of approximately 0.002 mm to approximately 0.1 mm. In some alternative embodiments, the container unit 502 may have a length and/or a thickness outside of these ranges without departing from the scope of this disclosure.

Figure 7:
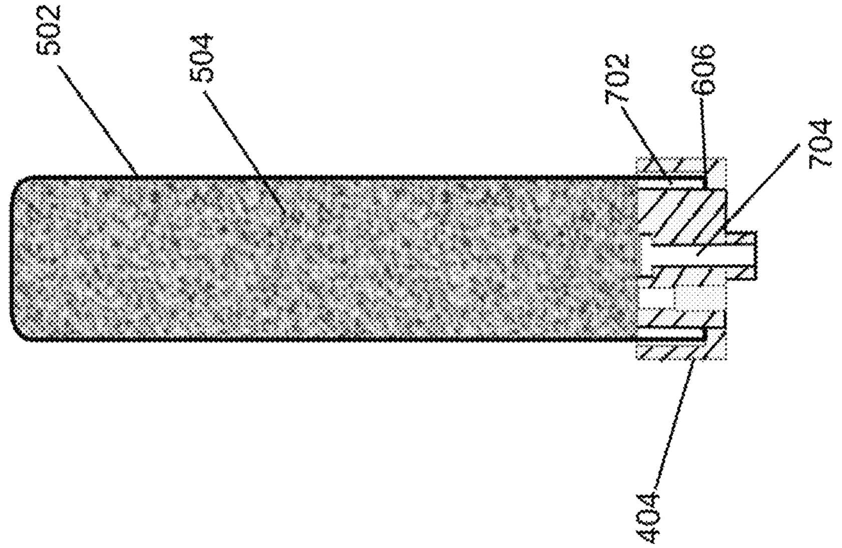
FIG. 7 illustrates the container unit of the electrode tube of FIG. 4 attached to a socket of the electrode tube according to an example embodiment.

FIG. 7 illustrates the container unit 502 of the electrode tube 400 of FIG. 4 attached to the socket 404 of the electrode tube 400 according to an example embodiment. In FIG. 7, the electrode screw 406 of the electrode tube 400 is omitted for clarity of illustration. Referring to FIGS. 1-7, in some example embodiments, the container unit 502 is positioned in a channel 702 of the socket 404. For example, the open-end portion 602 or a portion thereof may be positioned on the channel 702. The container unit 502 may be secured to the socket 404 using epoxy or another adhesive material in the channel 702.

Although the electrode screw 406 of the electrode tube 400 is omitted for clarity of illustration, typically, the electrode screw 406 is positioned in an electrode screw hole 704 before the container unit 502 is attached to the socket 404. Because the metal wool 504 is placed in the container unit 502 before the container unit 502 is attached to the socket 404, placing the open-end portion 602 in the channel 702 (i.e., attaching the container unit 502 to the socket 404) results in at least a portion of the electrode screw being inserted into the metal wool 504. In some example embodiments, the container unit 502 may be securely attached to the socket 404 using other means instead of or in addition to using epoxy.

Figure 9:
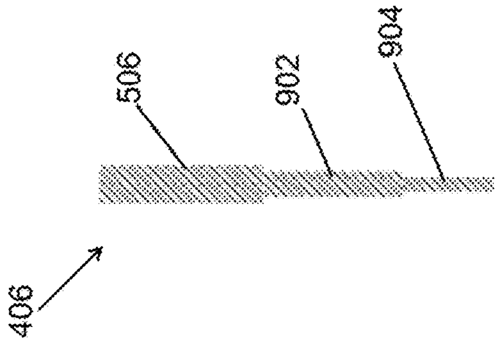
FIG. 9 illustrates the electrode screw of the electrode tube of FIG. 4 according to an example embodiment.
Figure 8:
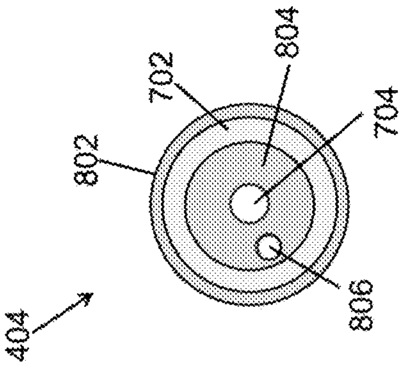
FIG. 8 illustrates the socket of the electrode tube of FIG. 4 according to an example embodiment.

FIG. 8 illustrates the socket 404 of the electrode tube 400 of FIG. 4 according to an example embodiment. FIG. 9 illustrates the electrode screw 406 of the electrode tube 400 of FIG. 4 according to an example embodiment. Referring to FIGS. 1-9, in some example embodiments, the socket 404 has an outer section 802, an inner section 804, and the channel 702 that is between the outer section 802 and the inner section 804. For example, the channel 702 may be an annular channel that extends around the inner section 804. The socket 404 may also include the electrode screw hole 704 that extends through the inner section 804. For example, the electrode screw hole 704 may be threaded, and the electrode screw 406 may be screwed in and through the electrode screw hole 704. The socket 404 may also include a valve hole 806 for attaching a gas valve therein.

As described above, the socket 404 may be made fully or partially from plastic using one or more methods such as molding, etc. For example, the outer section 802 of the socket 404 may be made from plastic, and the inner section 804 of the socket 404 that comes in contact with the electrode screw 406 may be made from G10 FR-4 composite material that is an electrical insulator with a low coefficient of thermal expansion. To illustrate, plastic may be molded around the inner section 804 made from G10 FR-4 composite material to form the outer section 802 around the inner section 804, thus forming the socket 404. The inner section 804 may be made from G10 FR-4 composite material using machining methods such as cutting, milling, etc. and/or other methods. In some applications, the use of G10 FR-4 composite material for the inner section 804 may enable the electrode tube 400 to be used at much higher voltage (e.g., 20K volts, 30K volts, 35K volts, etc.) from the transformer 210 than may be possible when the socket 404 is made entirely from plastic. Alternatively or in addition, the socket 404 may be made from another material, such as ceramic, without departing from the scope of this disclosure. In some alternative embodiments, the socket may have a different shape than shown without departing from the scope of this disclosure. In some alternative embodiments, the channel 702 may have a different shape than shown without departing from the scope of this disclosure.

In some example embodiments, the electrode screw 406 may have multiple portions 506, 902, 904. For example, all portions of the electrode screw 406 may be threaded. The portion 904 (i.e., lower portion) may be sized to be screwed into a receiving hole of the housing 110 of the air quality management device 100 to attach the electrode tube 400 to the housing 110. The lower portion 904 may also be attached to an electrical wire such as a wire of the electrical cable 216 shown in FIG. 2A. The portion (i.e., middle portion) 902 may have a larger diameter than the lower portion 904 and may be sized to be screwed into the electrode screw hole 704. The portion (i.e., upper portion) 506 may have a larger diameter than the middle portion 902 and the electrode screw hole 704. For example, the upper portion 506 coming in contact with the inner section 804 of the socket 404 may indicate that the electrode screw 406 has been adequately screwed into the electrode screw hole 704, enabling reasonably consistent attachment of the screw 406 to the socket 404.

In some example embodiments, the screw 406 may be made from stainless steel, such as 410 stainless steel. In some alternative embodiments, the screw 406 may be made from another material without departing from the scope of this disclosure. In some alternative embodiments, the electrode screw 406 may have a different shape than shown without departing from the scope of this disclosure. For example, the electrode screw 406 may include just two portions. As another example, some portions of the electrode screw 406 may not be threaded.

Figure 10:
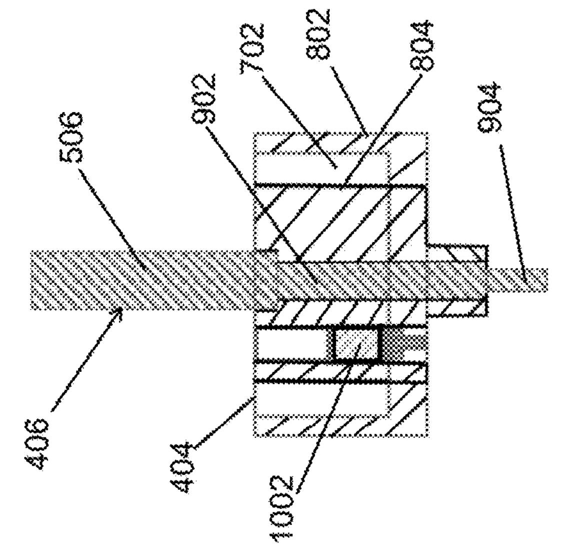
FIG. 10 illustrates the electrode screw of FIG. 9 attached to the socket of FIG. 8 according to an example embodiment.

FIG. 10 illustrates the electrode screw 406 of FIG. 9 attached to the socket 404 of FIG. 8 according to an example embodiment. Referring to FIGS. 1-10, in some example embodiments, the electrode screw 406 may be screwed into the screw hole 704 as shown in FIG. 10. A gas valve 1002 may be positioned in the valve hole 806. The gas valve 1002 may be used to control the flow of gas (e.g., argon) into and out of the container unit 502. For example, gas may be added to the container unit 502 through the gas valve 1002. To illustrate, the gas valve 1002 may operate in a similar manner as a tire valve. In some alternative embodiments, the valve hole 806 and the gas valve 1002 may be omitted without departing from the scope of this disclosure. For example, the electrode tube 400 may be operated without adding or remove the gas (e.g., argon) in the container unit 502.

As more clearly shown in FIG. 10, the lower portion 904 of the electrode screw 406 may extend out beyond the screw hole 704 of the socket 404. For example, the lower portion 904 of the electrode screw 406 may be screwed into a receiving hole of the housing 110. The middle portion 902 may be screwed into and positioned in the screw hole 704, and the upper portion 506 may be outside of the screw hole 704.

In some example embodiments, after the electrode screw 406 is attached to the socket 404 as shown in FIG. 10, the container unit 502 containing the metal wool 504 may be attached to the socket 404, where the open-end portion 602 of the container unit 502 is inserted into the channel 702 of the socket 404. For example, when the container unit 502 containing the metal wool 504 is pushed into the channel 702 of the socket 404, the electrode screw 406 is inserted into the metal wool 504 and makes contact with the metal wool 504. As described above, the container unit 502 may be secured to the socket 404 using, for example, epoxy that is placed in the channel 702 of the socket 404. For example, the epoxy may for an air-tight seal resulting in the cavity of the container unit 502 being sealed.

Figure 11:
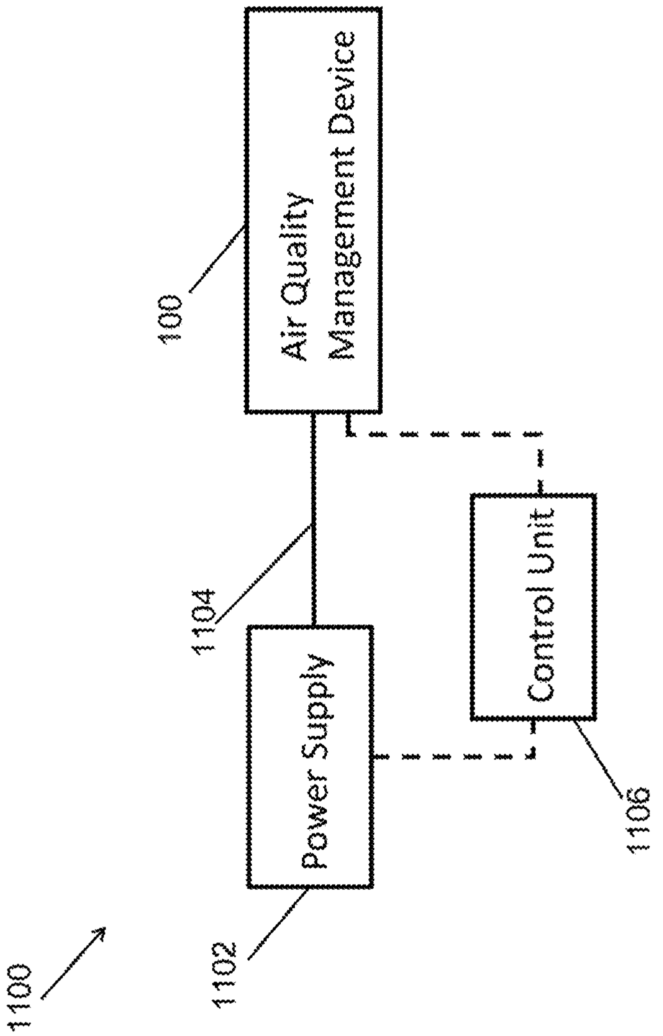
FIG. 11 illustrates an air quality management system including the quality management device of FIG. 1 according to an example embodiment.

FIG. 11 illustrates an air quality management system 1100 including the quality management device 100 of FIG. 1 according to an example embodiment. Referring to FIGS. 1-11, in some example embodiments, the air quality management device 100 may receive electric power from a power supply 1102 via an electrical connection 1104 (e.g., an electrical cable 228 shown in FIGS. 2A and 2B). To illustrate, the power supply 1102 may be a mains/utility AC power supply, a generator, etc. For example, the air quality management device 100 may receive 120V, 210V, or other voltage levels from the power supply 1102. The transformer 210 of the air quality management device 100 may receive the AC power from the power supply 1102 and provide, for example, electrical power to the electrode tubes of the air quality management device 100. For example, transformer 210 may provide one or more voltages in a range of approximately 2,000 volts AC to 20,000 volts AC to the electrode tubes of the air quality management device 100. The electrode tubes 102, 104, 202-208, 220-226 that may each correspond to the electrode tube 400 may generate electrons that can bond with oxygen in the air to produce negatively charged oxygen ions. The negatively charged oxygen ions that result from the bonding of the electrons have well known neutralizing effects on pollutants, odor, viruses, etc.

In some example embodiments, the air quality management system 1100 may include a control unit 1106 that may be used to control the operation of the air quality management device 100. For example, the control unit 1106 may be used by an operator to turn on/off the air quality management device 100. To illustrate, the power from the power supply 1102 may be provided to the air quality management device 100 through the control unit 1106 instead of via the connection 1104.

In some example embodiments, the control unit 1106 may be used by an operator to change the voltage level provided to the electrode tubes by the transformer 210. The control unit 1106 may be external to the air quality management device 100 as shown in FIG. 11. Alternatively, the control unit 1106 may be attached to or integrated with the housing 110 of the air quality management device 100.

Figure 12:
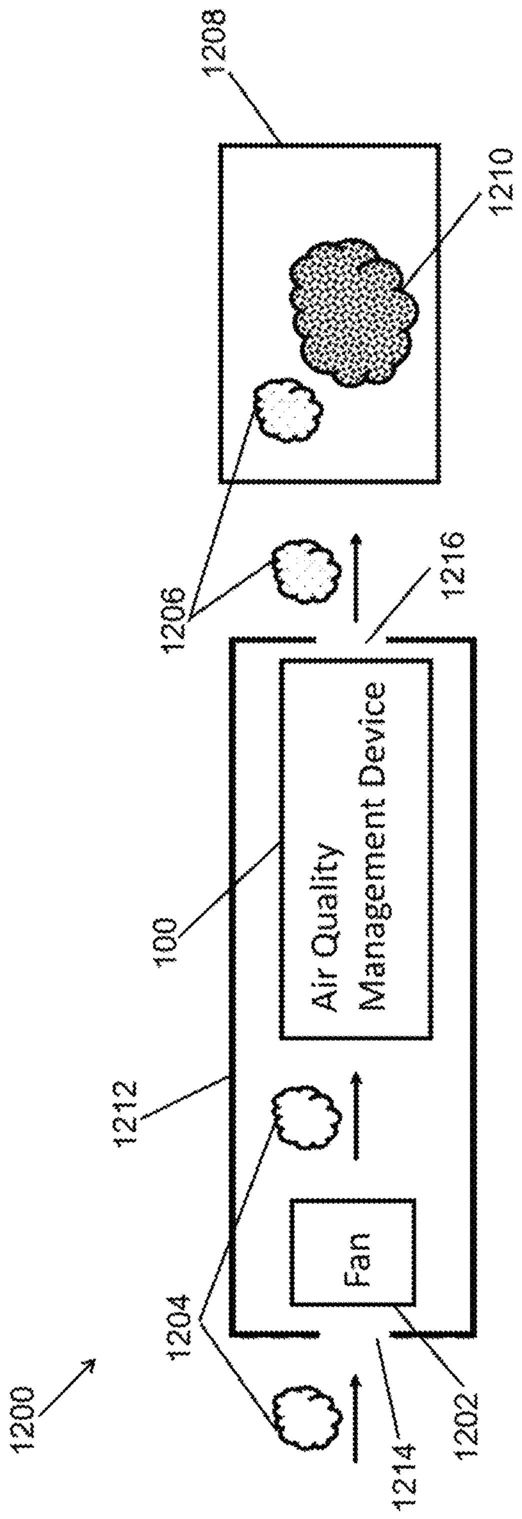
FIGS. 12-15 illustrate various air quality management systems including the quality management device of FIG. 1 according to example embodiments.

FIG. 12 illustrates an air quality management system 1200 including the quality management device 100 of FIG. 1 according to another example embodiment. Referring to FIGS. 1-12, in some example embodiments, the air quality management system 1200 includes the air quality management device 100 and a fan 1202 (e.g., a fan or a blower). For example, the system 1200 may be a single unit that includes the air quality management device 100 and the fan 1202. The fan 1202 may suck in/draw in and direct air 1204 (i.e., input air) toward the air quality management device 100 that is operating (i.e., generating electrons). For example, the air quality management device 100 and the fan 1202 may be in a confined space such as an enclosure 1212. The enclosure 1212 may have an inlet opening 1214 and an outlet opening 1216. For example, the enclosure 1212 may be or may be positioned in an air handler housing unit of an air conditioning system, furniture (e.g., a cabinet, a coffee table, etc.), a speaker, an artificial plant planter, a chandelier, etc. The air 1204 may enter the enclosure 1212 through the opening 1214, and air 1206 (i.e., output air) may exit the enclosure through the opening 1216. As another example, a portion (e.g., one side wall) of the enclosure 1212 may be behind a wall of a space (e.g., a room), where, for example, the opening 1216 through which the air 1206 exits an opening (e.g., perforated or fully open) in the wall of the space.

The air 1204 may be pushed by the fan 1202 toward the air quality management device 100 and pass by, between and around the electrode tubes of the air quality management device 100, where the electrons generated by the air quality management device 100 bond with the oxygen in the air 1204 resulting in air 1206 that contains negatively charged oxygen ions. For example, the air 1206 may be directed toward a space 1208 (e.g., a room), where the air 1206 can mix with dirty air 1210 (e.g., air that contains pollutants, viruses, odor, etc.) and neutralize, for example, the pollutants, viruses, and/or odor in the dirty air 1210 and result in cleaner air. The air 1206 may travel, for example, through a duct represented by the arrow between the enclosure 1212 and the space 1208 to reach the space 1208.

In some example embodiments, the air quality management device 100 may be in a supply air duct or a return air duct and the fan 1202 may be in the air handler unit of an air conditioning system. In some alternative embodiments, instead of the air 1206 being directed out from the enclosure 1212 via a duct, the enclosure 1212 may be coupled to a device/item, such as an artificial plant, a chandelier, etc., where the air 1206 exits the enclosure 1212 through the opening 1216, enters the device/item, and exits the device/item through, for example, perforations in the device. For example, the system 1200 may be located inside the space 1208. In some example embodiments, the enclosure 1212 may be a housing of an air conditioning unit, such as a window air conditioning unit, that contains air conditioning components as well as the air quality management device 100. For example, the fan 1202 may move the air 1204 both for air cooling purposes and for air quality control purposes. In some example embodiments, the enclosure 1212 may be made from plastic, metal, and/or other suitable material and may provide one or more openings, etc. for routing electrical and other cables in and out of the enclosure 1212.

In some alternative embodiments, the enclosure 1212 may have one or more inlet openings and one or more outlet openings that may be at different locations than the locations of the inlet opening 1214 and the outlet opening 1216, respectively. In some alternative embodiments, the enclosure 1212 may have a different shape than shown without departing from the scope of this disclosure. In some alternative embodiments, the enclosure 1212 and the system 1200 in general may include other components without departing from the scope of this disclosure.

Figure 13:
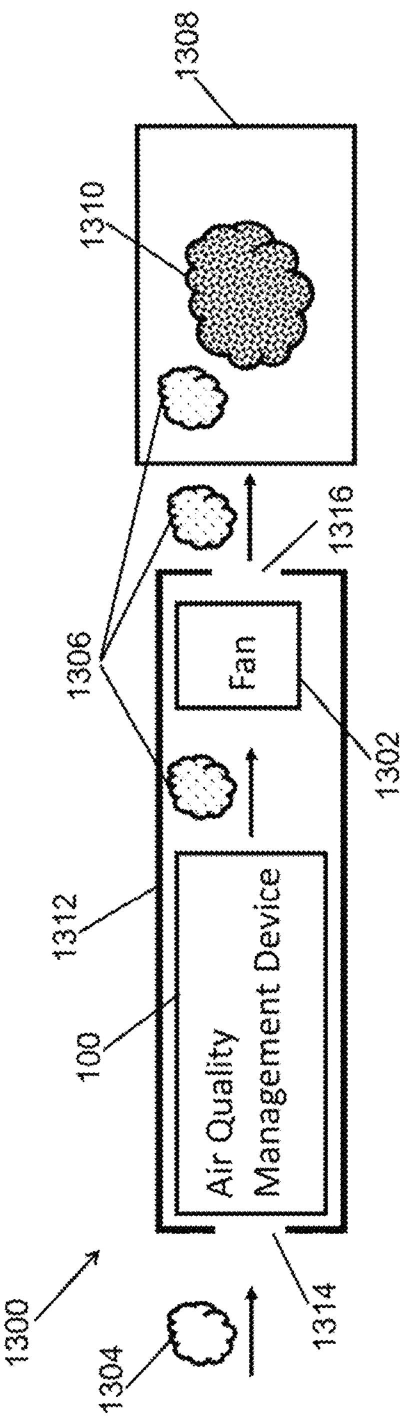

FIG. 13 illustrates an air quality management system 1300 including the quality management device 100 of FIG. 1 according to another example embodiment. Referring to FIGS. 1-13, in contrast to the system 1200 of FIG. 12, the system 1300 includes a fan 1302 (e.g., a fan or a blower) that is downwind of the air quality management device 100. The fan 1302 may draw in/suck air 1304 (i.e., input air) toward the air quality management device 100 that is operating (i.e., generating electrons). The fan 1302 may draw in the air 1304 through an opening 1314 in an enclosure 1312. For example, the air quality management device 100 and the fan 1302 may be in a confined space such as an enclosure 1312. The air 1304, pulled by the fan 1302, may pass between and around the electrode tubes 102, 104, 202-208, 220-226 of the air quality management device 100. The electrons generated by the air quality management device 100 can bond with oxygen in the air 1304 as the air 1304 passes by the electrode tubes 102, 104, 202-208, 220-226 resulting in air 1306 (i.e., output air) that includes negatively charged oxygen ions. The fan 1302 can push out the air 1306 that includes the negatively charged oxygen ions toward a space 1308 that may include dirty air 1310 (e.g., air that contains pollutants, viruses, odor, etc.). The air 1306 may mix with the dirty air 1310 in the space 1308 and neutralize, for example, pollutants, viruses, and/or odor in the dirty air 1310, resulting in cleaner air in the space 1308.

In some example embodiments, the system 1300 may be a single unit that includes the air quality management device 100 and the fan 1302. For example, the enclosure 1312 may be an air handler housing unit of an air conditioning system, and the air 1306 may travel through a duct system to reach the space 1308. As another example, the enclosure 1312 may be positioned in an air handler housing unit of an air conditioning system, and the air 1306 may travel through a duct system to reach the space 1308. Alternatively, the air quality management device 100 may be positioned in a supply air duct or a return air duct of an air conditioning system, and the fan 1302 may be in the air handler unit of the air conditioning system. As another example, a portion (e.g., one side wall) of the enclosure 1312 may be behind a wall of a space (e.g., a room), where, for example, the opening 1316 through which the air 1306 exits an opening (e.g., a vent) in the wall of the space 1308. In some example embodiments, the enclosure 1312 may be a housing of an air conditioning unit, such as a window air conditioning unit, that contains air conditioning components as well as the air quality management device 100. For example, the fan 1302 may move the air 1304 both for air cooling purposes and for air quality control purposes.

In some alternative embodiments, instead of the air 1306 being directed out from the enclosure 1312 through a duct, the enclosure 1312 may be coupled with a device, such as an artificial plant, a chandelier, etc., where the air 1306 exits the enclosure 1312 through the opening 1316, enters the device, and exits the device through, for example, perforations in the device. For example, the system 1300 may be located inside the space 1308. Alternatively, a wall of the enclosure 1312 may be part of the device (e.g., part of the housing of an artificial plant). In some example embodiments, the enclosure 1312 may be made from plastic, metal, and/or other suitable material and may provide one or more openings, etc. for routing electrical and other cables in and out of the enclosure 1312.

In some alternative embodiments, the enclosure 1312 may have one or more inlet openings and one or more outlet openings that may be at different locations than the locations of the inlet opening 1314 and the outlet opening 1316, respectively. In some alternative embodiments, the enclosure 1312 may have a different shape than shown without departing from the scope of this disclosure. In some alternative embodiments, the enclosure 1312 and the system 1300 in general may include other components without departing from the scope of this disclosure.

Figure 14:
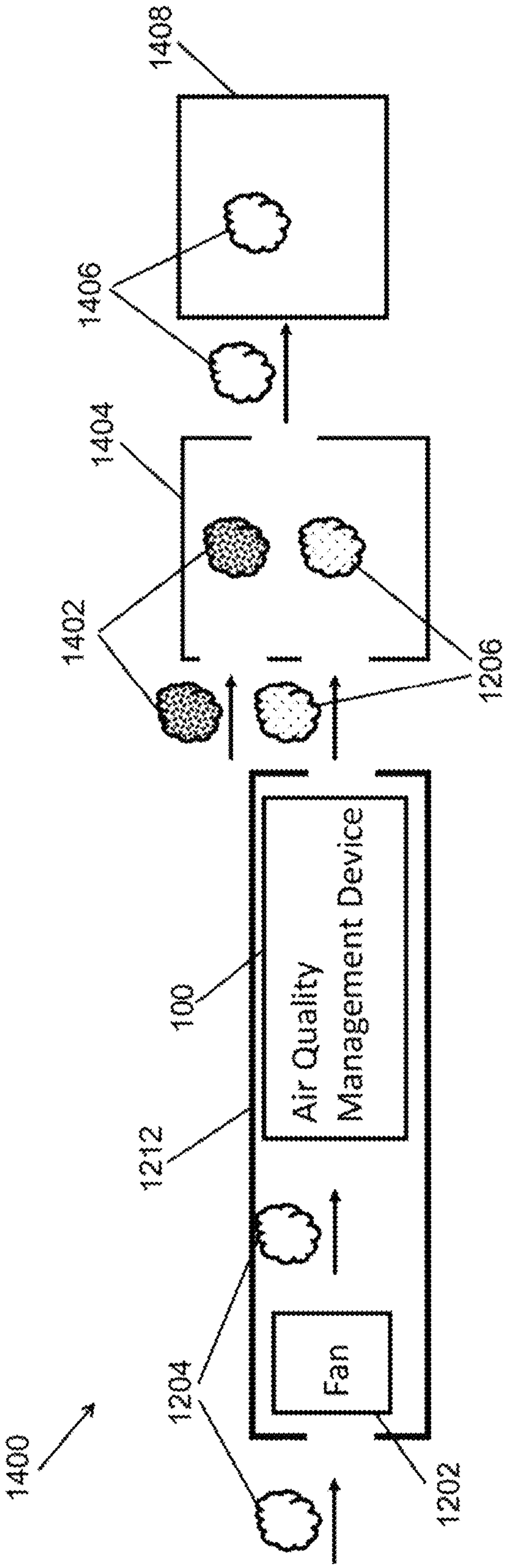

FIG. 14 illustrates an air quality management system 1400 including the quality management device 100 of FIG. 1 according to another example embodiment. Referring to FIGS. 1-12 and 14, in some example embodiments, the air quality management system 1400 includes the air quality management device 100 and the fan 1202. The fan 1202 may direct the air 1204 toward the air quality management device 100 that is operating (i.e., generating electrons) as described with respect to FIG. 12. As described above with respect to FIG. 12, the air quality management device 100 and the fan 1202 may be inside the enclosure 1212.

The air 1204 pushed by the fan 1202 may pass between and around the electrode tubes 102, 104, 202-208, 220-226 of the air quality management device 100. The electrons generated by the air quality management device 100 can bond with oxygen in the air 1204 as the air 1204 passes by the electrode tubes 102, 104, 202-208, 220-226 resulting in air 1206 that includes negatively charged oxygen ions. The fan 1202 can push the air 1206 toward a chamber 1404 that may contain dirty air 1402 (e.g., air that contains pollutants, viruses, odor, etc.) that enters the chamber 1404 from another space. The air 1206 may travel, for example, through a duct represented by the arrow between the enclosure 1212 and the chamber 1404 to reach the chamber 1404. The dirty air 1402 may also enter the chamber 1404 through a duct. The air 1206 that contains negatively charged oxygen ions may can mix with the dirty air 1402 in the chamber 1404 and neutralize, for example, the pollutants, viruses, and/or odor in the dirty air 1402 and produce cleaner air 1406. The cleaner air 1406 may travel to a space 1408 (e.g., a room) where one or more occupants may be present. The cleaner air 1406 may travel to the space 1408, for example, via a duct due to pressure resulting from the fan 1202. Alternatively, the chamber 1404 and the space 1408 may be adjoining spaces where the cleaner air 1406 enters the space 1408 directly from the chamber 1404.

In some example embodiments, the chamber 1404 may be inside the space 1408. For example, the chamber 1404 may correspond to a device (e.g., furniture, a speaker, a plant planter, etc.) that is in the space 1408. The chamber 1404 may also be positioned behind a wall of the space 1408 outside of view from within the space 1408 or may be built into the wall of the space 1408 with one or more openings made available through the wall for the air 1406 to enter the space 1408 therethrough.

In some example embodiments, the enclosure 1412 and the chamber 1404 may be made from plastic, metal, and/or other suitable material. The enclosure 1412 may provide one or more openings, etc. for routing electrical and other cables in and out of the enclosure 1212.

In some alternative embodiments, the enclosure 1412 may have one or more inlet openings and one or more outlet openings that may be at different locations. In some alternative embodiments, the enclosure 1412 and the chamber 1404 may have a different shape than shown without departing from the scope of this disclosure. In some alternative embodiments, the enclosure 1212 and the system 1400 in general may include other components without departing from the scope of this disclosure.

Figure 15:
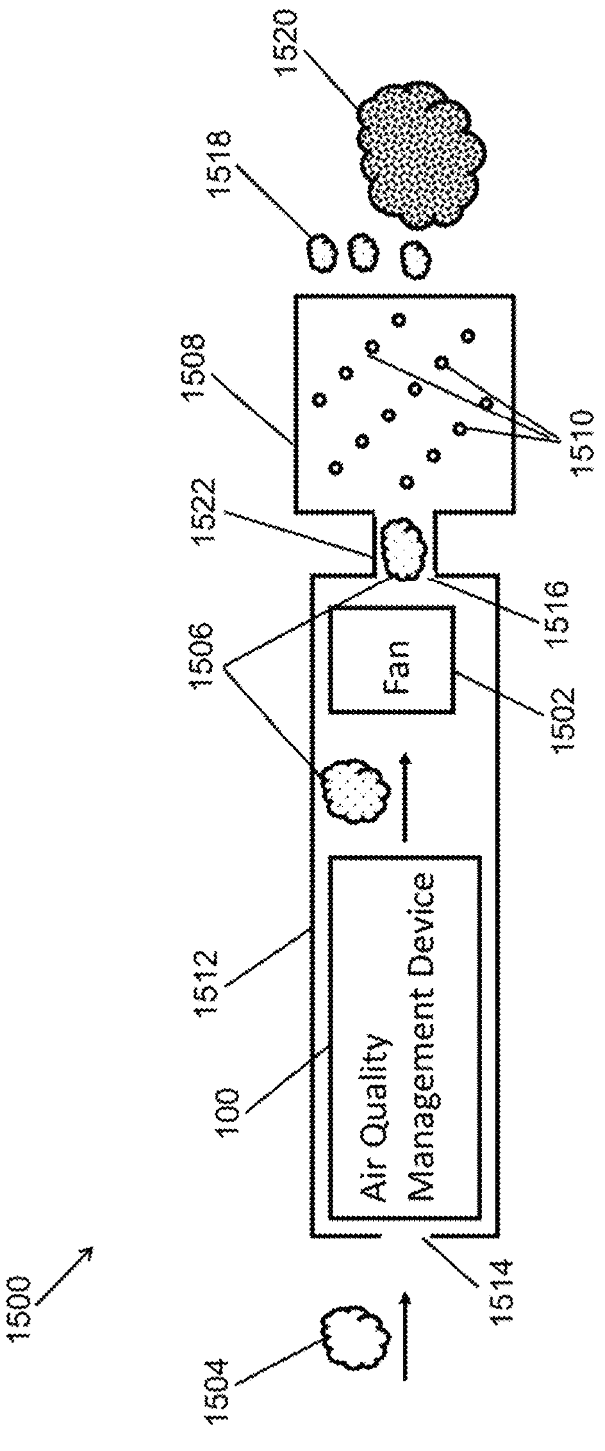

FIG. 15 illustrates an air quality management system 1500 including the quality management device 100 of FIG.

1 according to another example embodiment. Referring to FIGS. 1-13 and 15, the system 1500 includes the air quality management device 100 and a fan 1502 (e.g., a fan or a blower) that is downwind of the air quality management device 100 and sucks in (i.e., draws in) air 1504 (i.e., input air) through an opening 1514 in an enclosure 1512 such that the air 1504 passes by the air quality management device 100. The system 1500 may also include an outlet unit 1508 that is attached to the enclosure 1512. For example, the outlet unit 1508 may include or may be connected to the enclosure 1512 by a conduit 1522. For example, the conduit 1522 may be aligned with an outlet opening 1516 of the enclosure 1512.

In some example embodiments, as the air 1504 passes by the air quality management device 100, the electrons generated by the air quality management device 100 can bond with oxygen in the air 1504, resulting in air 1506 (i.e., output air) that includes negatively charged oxygen ions. The conduit 1522 may provide passageway for the air 1506 that includes the negatively charged oxygen ions to flow from the enclosure 1512 to the outlet unit 1508. The air 1506 that enters the outlet unit 1508 may exit the outlet unit 1508 through openings 1510 (e.g., perforations) of the outlet unit 1508 and spread in a space (e.g., a room) as air 1518 and interact with dirty air 1520. To be clear, the air 1518 is the air 1506 that has passed through the openings 1510 of the outlet unit 1508. For example, the openings 1510 may cause the air 1518 to travel in multiple directions and may facilitate the spreading of the air 1518 to different parts of a space. The interaction of the air 1518 with the dirty air 1520 may result in in cleaner air due to the neutralizing of pollutants, viruses, etc. in the dirty air 1520 by the negatively charged oxygen ions.

In some example embodiments, the conduit 1522 may be integrally formed with the enclosure 1512 instead of with the outlet unit 1508. In some example embodiments, the outlet unit 1508 may be removably attached to the conduit 1522. For example, the outlet unit 1508 may be threadedly attached to the conduit 1522. Alternatively or in addition, the conduit 1522 may be removably attached to the enclosure 1512. In some example embodiments, the outlet unit 1508 may be located in a space such as a room that may be occupied by occupants. For example, the outlet unit 1508 may be an air vent installed in a ceiling, a floor, a wall, etc. as can be readily understood by those of ordinary skill in the art with the benefit of the scope of this disclosure. Alternatively, the outlet unit 1508 may be a furniture item (e.g., a cabinet, part of a cabinet, a sofa, etc.), a plant planter, an artificial plant, a speaker, a light fixture (e.g., a chandelier), etc. For example, the openings 1510 may be formed in a surface/wall of the furniture item, a plant planter, an artificial plant, a speaker, a light fixture, etc. as can be readily understood by those of ordinary skill in the art with the benefit of the scope of this disclosure. The conduit 1522 (e.g., a rigid or flexible duct) may be attached to the outlet unit 1508 through a surface from below the particular item (e.g., through the floor), from a side (e.g., through a wall), or from above (e.g., through a ceiling), where the enclosure 1512 is behind the surface (e.g., floor, wall, ceiling, etc.) and where the conduit 1522 extends through the surface.

In some example embodiments, the system 1500 may be a single unit that includes the air quality management device 100, the fan 1502, and the outlet unit 1508. For example, the system 1500 may be placed in a space such as a room, etc. For example, the system 1500 may be placed in a kitchen, a bedroom, a bathroom, etc. Alternatively, the outlet unit 1508 may be in a space that gets occupied by people, and the enclosure 1512 including the air quality management device 100 and the fan 1502 may be out of view from an occupant of the room. For example, the outlet unit 1508 may be a vent installed in a wall, ceiling, or floor of a room and exposed to the room.

In some example embodiments, the enclosure 1512, the conduit 1522, and the outlet unit 1508 may be made from plastic, metal, and/or other suitable material. The enclosure 1512 may provide adequate openings, etc. for routing electrical and other cables in and out of the enclosure 1512.

In some alternative embodiments, the enclosure 1512 may have one or more inlet openings and one or more outlet openings that may be at different locations than shown in FIG. 15. In some alternative embodiments, the enclosure 1512, the conduit 1522, and the outlet unit 1508 may have a different shape than shown without departing from the scope of this disclosure. In some alternative embodiments, multiple ones of the outlet unit 1508 may be fluidly coupled to the enclosure 1512 such that the air 1506 is split among the multiple ones of the outlet unit 1508. For example, two, three, four, or more of the outlet unit 1508 may be fluidly coupled to the enclosure 1512 with respective conduits or in a different manner without departing from the scope of this disclosure. In some alternative embodiments, the openings 1510 of the outlet unit 1508 may have a different shape and/or placement than shown in FIG. 15 without departing from the scope of this disclosure. In some alternative embodiments, the enclosure 1512 and the system 1500 in general may include other components without departing from the scope of this disclosure.

Figure 16B:
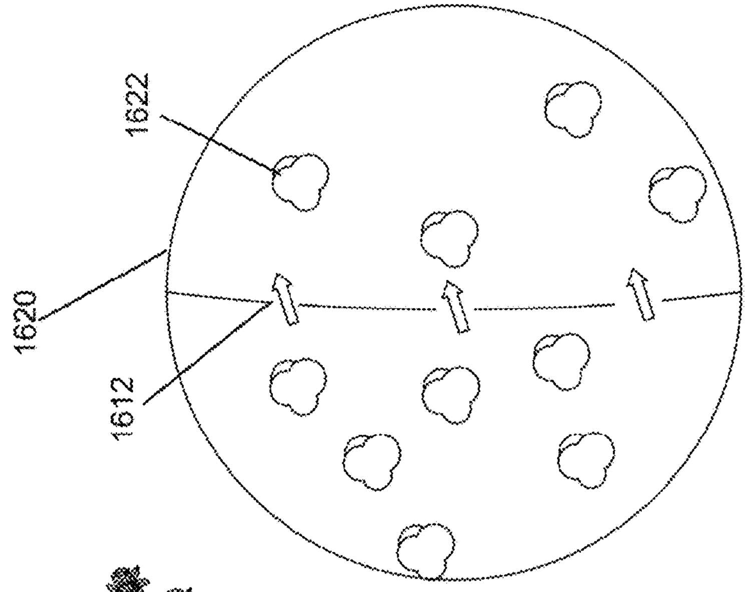
FIG. 16B illustrates a close-up view of a portion of the artificial plant air quality management unit of FIG. 16A according to an example embodiment.
Figure 16A:
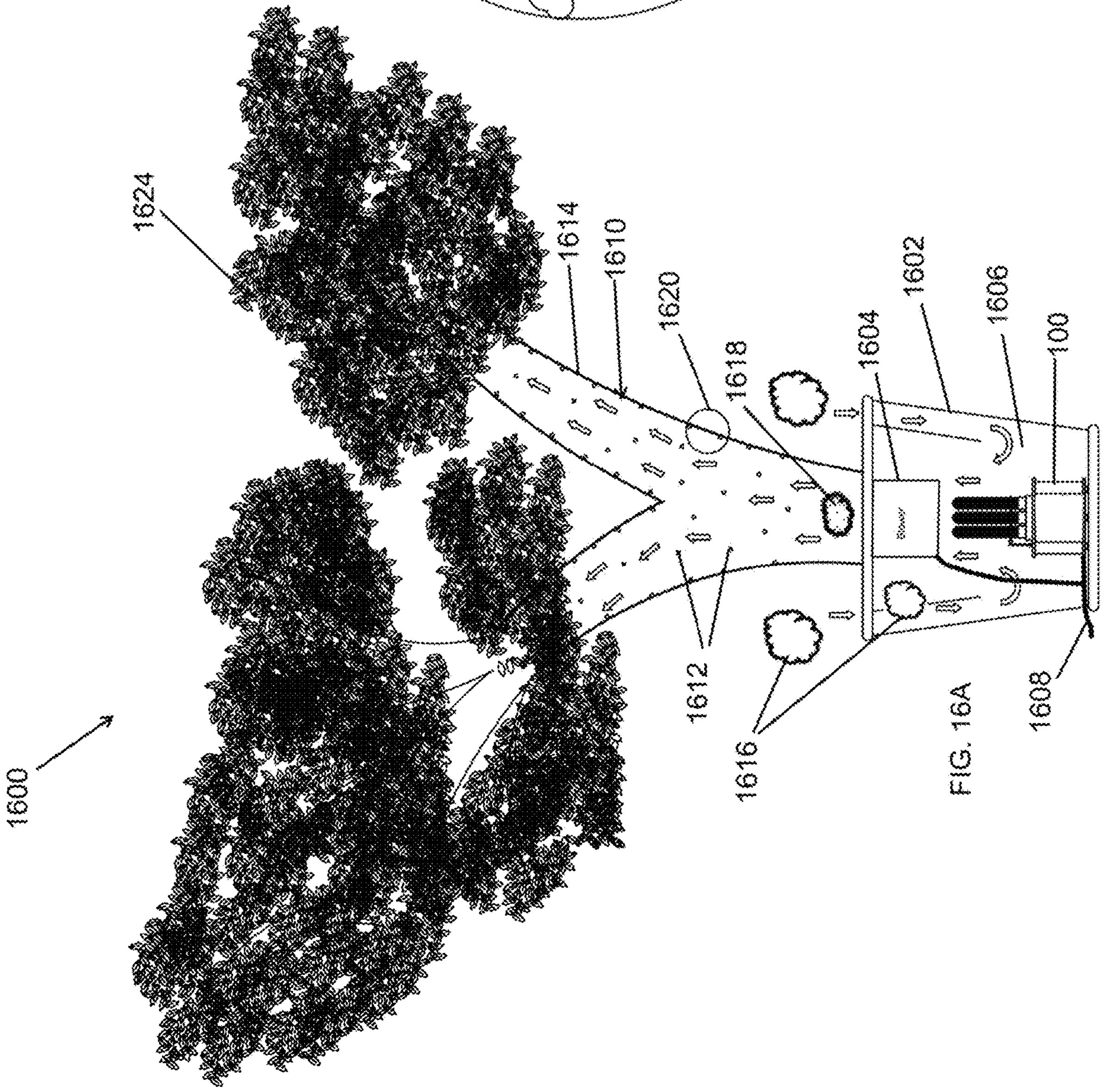
FIG. 16A illustrates an artificial plant air quality management unit that include the air quality management device of FIG. 1 according to an example embodiment.

FIG. 16A illustrates an artificial plant air quality management unit 1600 that includes the air quality management device 100 of FIG. 1 according to an example embodiment, and FIG. 16B shows a close-up view of a portion 1620 of the artificial plant air quality management unit 1600 according to an example embodiment. Referring to FIGS. 1-11, 13, 15, 16A, and 16B, in some example embodiments, the artificial plant air quality management unit 1600 includes a planter 1602 of an artificial plant 1610. The artificial plant air quality management unit 1600 also includes the air quality management device 100 positioned in a cavity 1606 of the planter 1602. For example, the artificial plant 1610 may include a trunk and/or branches 1614 and leaves 1624. The unit 1600 may also include a blower 1604 that is in the cavity 1606. The blower 1604 is positioned to pull air 1616 (i.e., input air) into the cavity 1606 through one or more openings of the planter 1602. For example, the blower 1604 may pull the air 1616 in from a space (e.g., a room) in which the artificial plant air quality management unit 1600 is located. The blower 1604 may also push air 1618 (i.e., output air) out from the cavity 1606 through one or more openings of the planter 1602. To illustrate, electrons generated by the air quality management device 100 may bond with oxygen in the air 1616 in the cavity 1606 of the planter 1602 as the air 1616 passes by the electrode tubes of the air quality management device 100, resulting in the air 1618 that includes negatively charged oxygen ions. For example, the air quality management device 100 in the embodiments shown in FIG. 16A may include fewer than all the electrode tubes 102, 104, 202-208, 220-226 described above, for example, with respect to FIG. 3.

In some example embodiments, the air 1618 that includes negatively charged oxygen ions may travel through the trunk and/or branches 1614 of the artificial plant 1610 and exit the trunk and/or branches 1614 through holes/perforations 1612 as air 1622 that includes the negatively charged oxygen. Alternatively or in addition, the leaves 1624 may include holes similar to the holes/perforations 1612 through which the air 1618 exits the artificial plant 1610 into a room.

In some example embodiments, electrical power may be provided to the air quality management device 100 and the blower 1604 via one or more electrical cables 1608. For example, the planter 1602 may include one or more holes for routing the one or more electrical cables 1608 into the cavity 1606 of the planter 1602. In some example embodiments, the outlet unit 1508 shown in FIG. 15 may correspond to the artificial plant 1610 of FIG. 16A. In some example embodiments, the planter 1602 may be a round planter or may have another shape without departing from the scope of this disclosure. The planter 1602 and the artificial plant 1610 may be made from one or more materials such as plastic, rubber, metal, etc. as can be readily understood by those of ordinary skill in the art with the benefit of the scope of this disclosure. Because the artificial plant 1610 may be aesthetically suitable in some spaces such as hotel rooms, lobbies, etc., the artificial plant air quality management unit 1600 may be particularly desirable for use in such spaces. In some example embodiments, the planter 1602 may be decorated as desired for particular spaces.

In some alternative embodiments, the components of the unit 1600 may have a different shape and/or features than shown without departing from the scope of this disclosure. For example, the artificial plant 1610 may have more or fewer branches, leaves, etc. In some alternative embodiments, the planter 1602 may have openings at different locations than shown without departing from the scope of this disclosure. For example, the air 1616 may enter the cavity 1606 of the planter 1602 on one or more sides instead of or in addition to the top of the planter 1602. In some example embodiments, the planter 1602 may be fully or partially opaque or fully transparent without departing from the scope of this disclosure. In some alternative embodiments, the blower 1604 and/or the air quality management device 100 may be at different locations in the planter 1602 than shown without departing from the scope of this disclosure. In some alternative embodiments, the air quality management device 100 and the blower 1604 may be in a different item instead of in the planter 1602 without departing from the scope of this disclosure. For example, the planter 1602 may be replaced by a speaker that functions as a speaker while serving as a container for the air quality management device 100 and the blower 1604. As another example, a furniture item may be used instead of the planter 1602 without departing from the scope of this disclosure.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the scope of the following claims, the scope of which are to be accorded the broadest interpretation so as to encompass modifications and equivalent structures.

What is claimed is:

1. An electrode tube for generating electrons, the electrode tube comprising:

a container unit;

a metal wool positioned in the container unit; and a socket, wherein the container unit is attached to the socket, wherein the electrode tube is configured to generate electrons that bond with oxygen when electrical power is provided to the electrode tube, wherein the socket comprises a valve that is positioned in a valve hole extending through the socket, wherein the container unit contains a gas that is added into the container unit through the valve, and wherein the gas includes argon.

2. The electrode tube of claim 1, wherein the container unit is made from quartz.

3. The electrode tube of claim 2, further comprising an electrode screw extending through the socket, wherein a portion of the electrode screw is in contact with the metal wool inside the container unit, and wherein the electrical power is provided to the electrode tube via the electrode screw.

4. The electrode tube of claim 3, wherein an inner portion of the socket is made from G10 FR4, wherein the electrode screw extends through the socket by extending through a hole in the inner section made from G10 FR4, and wherein the electrode screw is in contact with the inner portion of the socket.

5. The electrode tube of claim 3, wherein an open-end portion of the container unit is positioned in a channel between an outer portion of the socket and an inner portion of the socket.

6. The electrode tube of claim 1, wherein the electrode tube further comprises a wire mesh positioned over at least a portion of the container unit.

7. The electrode tube of claim 1, further comprising an electrode screw that comprises a lower portion, an upper portion, and a middle portion, wherein the upper portion extends from the middle portion that extends from the lower portion, wherein the upper portion has a larger diameter than the middle portion that has a larger diameter than the lower portion, wherein the middle portion is threadedly attached to the socket through an electrode screw hole of the socket, wherein the lower portion is positioned outside of the electrode screw hole, and wherein the upper portion extends into the metal wool positioned in the container unit.

8. An air quality management device, comprising:

an electrode tube; and a transformer configured to provide electrical power to the electrode tube, wherein the electrode tube comprises:

a container unit;

a metal wool positioned in the container unit; and a socket, wherein the container unit is attached to the socket, wherein the electrode tube is configured to generate electrons that bond with oxygen, wherein the socket comprises a valve that is positioned in a valve hole extending through the socket, wherein the container unit contains a gas that is added into the container unit through the valve, and wherein the gas includes argon.

9. The air quality management device of claim 8, further comprising a second electrode tube comprising:

a second container unit;

a second metal wool positioned in the second container unit; and a second socket, wherein the second container unit is attached to the second socket, wherein the transformer is configured to provide the electrical power to the second electrode tube.

10. The air quality management device of claim 8, wherein the container unit is made from quartz.

11. The air quality management device of claim 10, further comprising an electrode screw extending through the socket, wherein a first portion of the electrode screw extends into the container unit and is in contact with the metal wool inside the container unit, wherein a second portion of the electrode screw extends out at an end of the socket opposite the container unit and is in electrical contact with the transformer, and wherein the transformer is configured to provide the electrical power to the electrode tube via the electrode screw.

12. The air quality management device of claim 11, wherein an inner portion of the socket is made from G10 FR4, wherein the electrode screw extends through the socket by extending through a hole in the inner section, and wherein the electrode screw is in contact with the inner portion of the socket.

13. The air quality management device of claim 12, wherein the transformer is configured to provide the electrical power to the electrode tube by providing a voltage in a range of 2,000 volts AC to 20,000 volts AC.

14. The air quality management device of claim 11, further comprising a housing made from Polyvinyl chloride (PVC), wherein the transformer is contained in the housing and wherein the electrode tube is attached to the housing such that the container unit is positioned outside of the housing.

15. The air quality management device of claim 8, wherein the electrode tube further comprises a wire mesh positioned over at least a portion of the container unit.

16. An air quality management system, comprising:

an air quality management device comprising:

an electrode tube; and a transformer configured to provide electrical power to the electrode tube, wherein the electrode tube comprises:

a container unit;

a metal wool positioned in the container unit; and a socket, wherein the container unit is attached to the socket, wherein the socket comprises a valve that is positioned in a valve hole extending through the socket, wherein the container unit contains a gas that is added into the container unit through the valve, and wherein the gas includes argon; and a blower positioned to cause input air to flow past the electrode tube such that electrons produced by the electrode tube bond to oxygen in the input air resulting in output air that contains negatively charged oxygen ions and wherein the blower is positioned to cause the output air to exit the air quality management system.

17. The air quality management system of claim 16, wherein the container unit is made from quartz.

18. The air quality management system of claim 17, wherein the transformer provides the electrical power to the electrode tube by providing a voltage in a range of 2,000 volts AC to 20,000 volts AC.

19. The air quality management system of claim 16, wherein the air quality management device and the blower are positioned in a plant planter and wherein an artificial plant is coupled to the planter such that the output air from the plant planter exits through openings in the artificial plant.

20. The air quality management system of claim 16, wherein the air quality management device and the blower are positioned in an air conditioning unit.

* * * * *